US012804056B2

(12) United States Patent
Hebbar

(10) Patent No.: US 12,804,056 B2
(45) Date of Patent: Nov. 17, 2026

(54) AUTOMATED INTERACTION-EVENT ROUTING COMPUTER SYSTEM

(71) Applicant: Truist Bank, Charlotte, NC (US)

(72) Inventor: Nagaraja Hebbar, Atlanta, GA (US)

(73) Assignee: TRUIST BANK, Charlotte, NC (US)

( * ) Notice: Subject to any disclaimer, the term of this patent is extended or adjusted under 35 U.S.C. 154(b) by 30 days.

(21) Appl. No.: 19/007,976

(22) Filed: Jan. 2, 2025

(65) Prior Publication Data

US 2025/0133147 A1 Apr. 24, 2025

Related U.S. Application Data

(63) Continuation of application No. 18/125,375, filed on Mar. 23, 2023, now Pat. No. 12,206,750.

(51) Int. Cl.
*H04L 67/63* (2022.01)
*H04L 67/30* (2022.01)

(52) U.S. Cl.
CPC .............. *H04L 67/63* (2022.05); *H04L 67/30* (2013.01)

(58) Field of Classification Search
CPC ................................ H04L 67/63; H04L 67/30
USPC .......................................................... 709/201
See application file for complete search history.

(56) References Cited

U.S. PATENT DOCUMENTS

| | | | |
|---|---|---|---|
| 10,163,083 B2 | 12/2018 | Guido et al. | |
| 2007/0162387 A1 | 7/2007 | Cataline et al. | |
| 2012/0008506 A1 | 1/2012 | Astigarraga et al. | |
| 2014/0219162 A1* | 8/2014 | Eyuboglu | H04W 72/23 370/315 |
| 2016/0180304 A1 | 6/2016 | Carriles et al. | |
| 2017/0264537 A1 | 9/2017 | Patil et al. | |
| 2021/0042712 A1* | 2/2021 | Crowley | G06Q 20/381 |
| 2021/0174410 A1 | 6/2021 | Anderson et al. | |
| 2021/0336841 A1 | 10/2021 | Ranatunga et al. | |
| 2023/0082261 A1* | 3/2023 | Johnston | G06Q 20/227 |
| 2023/0105919 A1 | 4/2023 | Kanjlia et al. | |

(Continued)

OTHER PUBLICATIONS

U.S. Appl. No. 18/125,375 , Advisory Action, Mailed On Apr. 25, 2024, 5 pages.

(Continued)

*Primary Examiner* — Ario Etienne
*Assistant Examiner* — Kidest Mendaye
(74) *Attorney, Agent, or Firm* — Michael A. Springs, Esq.; Shumaker, Loop & Kendrick, LLP; Patrick B. Horne

(57) ABSTRACT

An interaction-event routing system can automatically select an optimal interaction-event rail (IER) to process an interaction-event request. For example, the interaction-event routing system can include a processor and a memory that includes instructions executable by the processor to perform operations. The operations can include receiving a request to process an interaction event from an application programming interface. The request can include at least one parameter. The operations can further include automatically selecting, based on the at least one parameter, an IER from among a plurality of IERs to process the interaction event. The plurality of IERs can be configured to digitally transfer value between accounts using different protocols. Additionally, the operations can include transforming the request into a rail specific request suitable for the selected IER. The operations can include submitting the rail specific request to the selected IER.

20 Claims, 3 Drawing Sheets

(56) References Cited

U.S. PATENT DOCUMENTS

| | | | | |
|---|---|---|---|---|
| 2023/0230061 | A1 | 7/2023 | Creatore et al. | |
| 2023/0289750 | A1* | 9/2023 | Wied | G06Q 20/065 |
| 2023/0289751 | A1 | 9/2023 | Wied et al. | |

OTHER PUBLICATIONS

U.S. Appl. No. 18/125,375 , "Corrected Notice of Allowability", Sep. 27, 2024, 3 pages.
U.S. Appl. No. 18/125,375 , Final Office Action, Mailed On Mar. 15, 2024, 19 pages.
U.S. Appl. No. 18/125,375 , Non-Final Office Action, Mailed On Dec. 19, 2023, 16 pages.
U.S. Appl. No. 18/125,375 , Non-Final Office Action, Mailed On Jun. 7, 2024, 37 pages.
U.S. Appl. No. 18/125,375 , Notice of Allowance, Mailed On Sep. 16, 2024, 8 pages.

* cited by examiner

AUTOMATED INTERACTION-EVENT ROUTING COMPUTER SYSTEM

CROSS-REFERENCE TO RELATED APPLICATIONS

The present application is a continuation of U.S. patent application Ser. No. 18/125,375, filed Mar. 23, 2023, titled "AUTOMATED INTERACTION-EVEN ROUTING COMPUTER SYSTEM," the entirety of which is incorporated herein by reference.

TECHNICAL FIELD

The present disclosure relates generally to interaction-event processing and, more particularly (although not necessarily exclusively), to automated routing of interaction-events through a computer network.

BACKGROUND

In a computer system, there can be many different interaction-event rails configured to process interaction-event requests. Each interaction-event rail may require different input data in order to handle an interaction-event request. In some examples, interaction-event rails can be more effective at handling interaction-event requests when the input data is in a particular format. Certain kinds of interaction-event rails can handle certain kinds of interaction-event requests more effectively than other interaction-event rails.

SUMMARY

An optimal interaction-event rail can be automatically selected to process an interaction-event request based on various criteria. For example, an interaction-event routing system described herein can include one or more processors. The interaction-event routing system can also include one or more memories. The one or more memories can include instructions executable by the one or more processors to perform operations. The operations can include receiving a request to process an interaction-event from an application programming interface (API). The request can include at least one parameter. The operations can also include automatically selecting, based on the at least one parameter, an interaction-event rail from among a plurality of interaction-event rails to process the interaction-event. The plurality of interaction-event rails can be configured to digitally transfer value between accounts using different protocols. Additionally, the operations can include transforming the request into a rail specific request suitable for the selected interaction-event rail. The operations can further include submitting the rail specific request to the selected interaction-event rail.

In another example, a computer-implemented method described herein can include receiving a request to process an interaction-event from an application programming interface (API). The request can include at least one parameter. The computer-implemented method can also include automatically selecting, based on the at least one parameter, an interaction-event rail from among a plurality of interaction-event rails to process the interaction-event. Additionally, the computer-implemented method can include transforming the request into a rail specific request suitable for the selected interaction-event rail. The computer-implemented method can further include submitting the rail specific request to the selected interaction-event rail. The computer-implemented method can include digitally transferring value between accounts using a protocol specific to the selected interaction-event rail.

In another example, a non-transitory computer-readable medium described herein can include instructions that are executable by one or more processors for causing the one or more processors to perform operations. The operations can include receiving a request to process an interaction-event from an application programming interface (API). The request can include at least one parameter. The operations can also include automatically selecting, based on the at least one parameter, an interaction-event rail from among a plurality of interaction-event rails to process the interaction-event. The plurality of interaction-event rails can be configured to digitally transfer value between accounts using different protocols. Additionally, the operations can include transforming the request into a rail specific request suitable for the selected interaction-event rail. The operations can further include submitting the rail specific request to the selected interaction-event rail.

DETAILED DESCRIPTION

Figure 1:
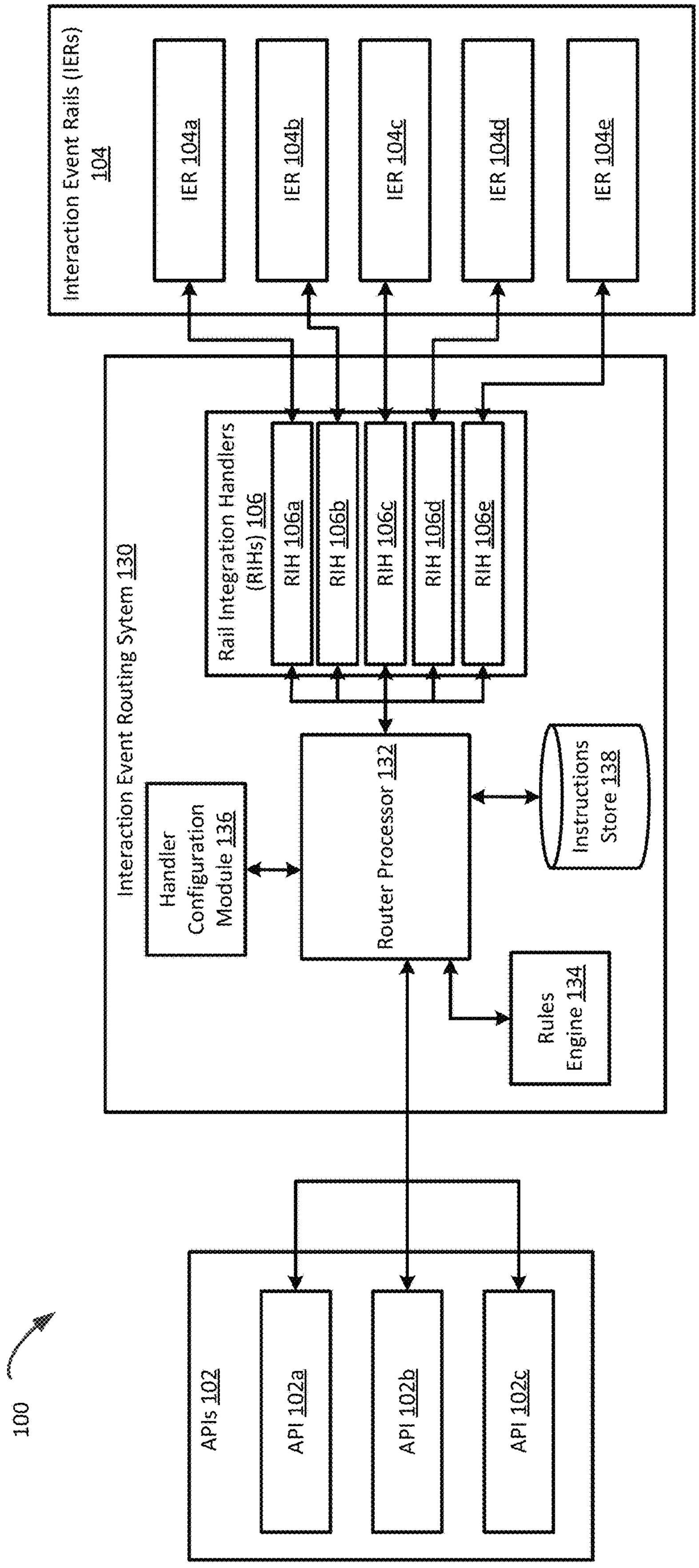
FIG. 1 is a block diagram of an example of an interaction-event routing environment according to some aspects of the present disclosure.

Certain aspects and examples of the present disclosure relate to an interaction-event routing computer system that can automatically select an optimal interaction-event rail to process an interaction-event request based on various criteria, which may be included in the interaction-event request and/or in corresponding configuration data. An interaction-event rail can be a platform or network infrastructure that can allow interaction events involving multiple accounts to be processed. The "optimal" interaction-event rail can be whichever event rail among the available options is best suited to handle the interaction-event request, according to at least one predefined criterion. The multiple accounts can involve separate parties and, in some cases, the parties can be based in different countries. Processing an interaction event can involve digitally transferring value between accounts under different protocols.

For instance, a first interaction-event rail can process an interaction-event in real-time, meaning that the transfer of value between accounts can be initiated, cleared, and settled nearly instantaneously (e.g., within seconds). The first interaction-event rail can be available to process interaction-events at all times (e.g., 24 hours a day, 7 days a week). By contrast, a second interaction-event rail can process interaction-event rails in batches, meaning that a group of interaction-events are processed together and may take longer to initiate, clear, and settle than interaction-events that are processed in real-time.

The interaction-event routing computer system can apply a rules engine to the interaction-event request to determine the optimal interaction-event rail. Additionally, the interaction-event routing system can transform the interaction-event request into a rail specific request to streamline processing of the interaction-event. This transformation may involve customizing the interaction-event request to meet one or more requirements of the selected interaction-event rail, for example, so that the request has a format and/or dataset required by the selected interaction-event rail.

The interaction-event request can be received from an application programming interface (API) and the criteria can include request parameters, such as a time limit for resolving the interaction-event request. The parameters can include information explicitly provided by a client such as instructions for resolving the interaction-event request. The parameters can also include information that the interaction-event routing computer system can infer from characteristics of the request, such as the type of API that submitted the request or a location of origin associated with the request. The rules engine can include logic for identifying optimal interaction-event rails based on the request parameters.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of an interaction-event routing environment 100 according to some aspects of the present disclosure. The interaction-event routing environment 100 can include a plurality of APIs 102, an interaction-event routing system 130, and a plurality of interaction-event rails 104. Each API of the plurality of APIs 102 and each interaction-event rail of the plurality of interaction-event rails 104 can send and receive communication with the interaction-event routing system 130 over one or more communication networks. The one or more communication networks may correspond to one or more Wide Area Networks ("WANs"), such as the Internet, through which the interaction-event routing system 130, each API of the plurality of APIs 102, and each interaction-event rail of the plurality of interaction-event rails 104 may communicate with servers via web browsers or client-side applications, to establish communication sessions, request and receive web-based resources, and access other features of applications or services.

The plurality of APIs 102 can include API 102*a*, API 102*b*, and API 102*c*. Although three APIs are depicted in FIG. 1, the plurality of APIs 102 can include any number of APIs, including one API. An API can provide a means for two or more computer programs to communicate with each other. The API can receive a request for an interaction-event from a client program. The client program can be, for example, a web app in a browser. The API can call up a web server and pass along the interaction-event request to the interaction-event routing system 130.

The plurality of interaction-event rails 104 can include IER 104*a*, IER 104*b*, IER 104*c*, IER 104*d*, and IER 104*e*. Although five interaction-event rails are depicted in FIG. 1, the plurality of interaction-event rails 104 can include any number of interaction-event rails, including one interaction-event rail. Each interaction-event rail can be configured to digitally transfer values between accounts using different protocols. For example, protocols can be defined by a category of interaction-event. Types of interaction-events can include international, domestic, interaction-events resolved in real-time, recurring interaction-events, interaction-events that can be grouped in batches, etc. Some interaction-events can involve a conversion of units for the values as a part of the protocol.

The interaction-event routing system 130 can include a router processor 132, a handler configuration module 136, a rules engine 134, an instructions store 138, and a set of rail-integration handlers (RIHs 106). The set of RIHs 106 can include RIH 106*a*, RIH 106*b*, RIH 106*c*, RIH 106*d*, and RIH 106*e*. Each RIH of the set of RIHs 106 can correspond to one interaction-event rail of the plurality of interaction-event rails 104. For example RIH 106*d* can correspond to IER 104*d*. Although five RIHs are depicted in FIG. 1, the plurality of RIHs 106 can include any number of RIHs, including one RIH.

The router processor 132 of the interaction-event routing system 130 can receive a request to process an interaction-event from an API of the plurality of APIs 102. The request can include parameters. The router processor 132 can use the handler configuration module 136, the rules engine 134, or the instructions store 138 to automatically select, based on the parameters, an optimal interaction-event rail from among the plurality of interaction-event rails 104 to process the interaction-event.

For example, the handler configuration module 136 can include information that describes capabilities of each rail integration handler of the plurality of rail-integration handlers 106. The handler configuration module 136 can be quickly and easily updated to integrate additional rail-integration handlers into the interaction-event routing system 130. The router processor 132 can evaluate header information associated with the request and check to see if the header information identifies information that is consistent with any of the capabilities described in the handler configuration module 136. If the header information does include information that is consistent with the capabilities of a single rail integration handler, the router processor 132 can identify the interaction event rail associated with the single rail integration handler as the optimal interaction event rail.

As an example, RIH 106*c* may be the only rail integration handler of the plurality of rail-integration handlers 106 that can collect requests into groups of requests or batches. RIH 106*c* can periodically (e.g., every hour, every three hours, etc.) send batches of requests to IER 104*c* for processing. The router processor 132 can receive an interaction event request that has header information. The header information for the request can specify that the interaction event should be processed as part of a batch. The router processor 132 can determine through the handler configuration module 136 that RIH 106*c* is the only rail-integration handler that can satisfy the interaction-event request and thus, the router processor 132 can use the handler configuration module 136 to select IER 104*c* (the interaction-event rail associated with RIH 106*c*) as the optimal interaction-event rail to process the interaction-event request.

If the header information of an interaction-event request does not include enough information to determine an optimal interaction-event rail, the router processor 132 can use the rules engine 134 and/or the instructions store 138 to help select the optimal interaction-event rail. Data associated with interaction-event requests can be stored in the instructions store 138. The data can include details associated with the interaction-event request, updates received from a selected interaction-event rail, and data associated with processing the interaction-event request, such as a time for completion of the interaction-event request or a cost associated with processing the interaction-event request. The rules engine 134 can include logic for identifying optimal interaction-event rails.

As an example, a interaction-event request can include criteria such as an amount of value to be transferred as part of the interaction-event, a maximum time limit for processing the interaction-event, and instructions to resolve the interaction-event in the least expensive manner possible. The rules engine 134 can be used to identify three interaction event rails that are able to process the interaction-event within the maximum time limit: IER **104*b*, 104*d*, and 104*e*. The rules engine 134 can rule out IER 104*b* because the amount of value exceeds a maximum amount permitted when using IER 104*b*, leaving IER 104*d* and 104*e* as candidates. The rules engine 134 can then select the interaction-event rail that can process the interaction-event in the least expensive manner between IER 104*d* and 104*e* as the optimal interaction-event rail. For example, data stored in the instructions store 138** can assist in determining which interaction-event rail can process the interaction-event in the least expensive manner.

The router processor 132 can transmit the request to an optimal RIH. The optimal RIH can correspond or be related to the optimal interaction-event rail. For example, when IER **104*c* is selected as the optimal interaction-event rail, the optimal RIH is RIH 106*c***. The optimal RIH can transform the request into a rail-specific request suitable for the optimal interaction-event rail. This may involve transforming the request into a format that is compatible with the optimal interaction-event rail, enriching the request to include required fields of the optimal interaction-event rail, etc. The optimal RIH can submit the rail specific request to the optimal interaction-event rail. The optimal interaction-event rail can digitally transfer value between accounts using protocols that are specific to the optimal interaction-event rail.

In some examples, the interaction-event can include a payment. API **102*a* can be a custom payment service (CPS) API. API 102*b* can be a real-time payment (RTP) API. API 102*c* can be a wire payment API. Another example of an API can be an Automated Clearing House (ACH) payment API. IER 104*a* can be a RTP payment rail and RIH 106*a* can be a RTP integration handler. IER 104*b* can be a money transfer system (MTS) wire payment rail and RIH 106*b* can be a MTS wire integration handler. IER 104*c* can be a Zelle-financial transaction manager (FTM) payment rail and RIH 106*c* can be a Zelle-FTM integration handler. IER 104*d* can be a PEP+ ACH payment rail and RIH 106*d* can be a PEP+ ACH integration handler. IER 104*e* can be a CPS payment rail and RIH 106*e*** can be a CPS integration handler.

Figure 2:
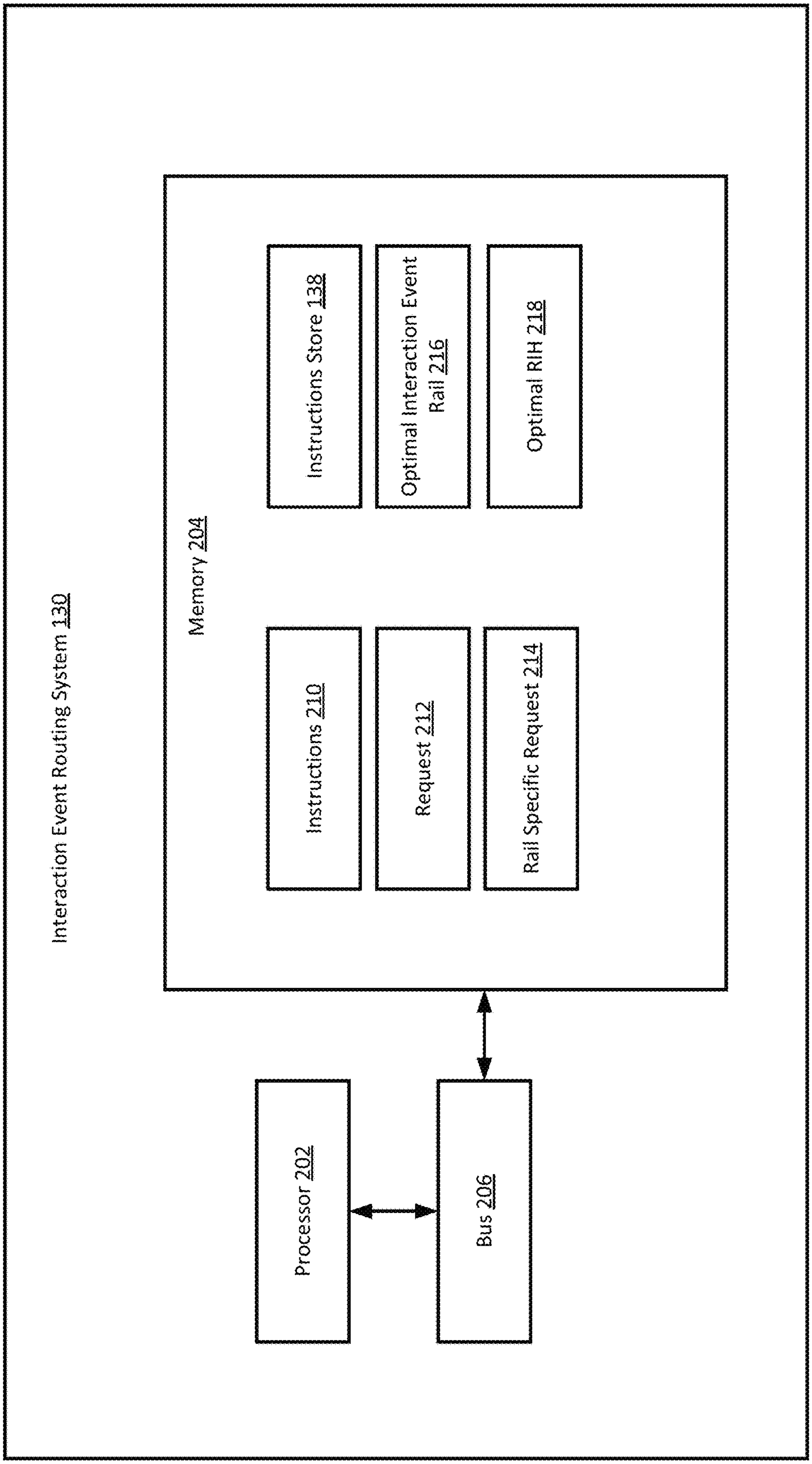
FIG. 2 is a block diagram of an example of an interaction-event routing system according to some aspects of the present disclosure.

FIG. 2 is a block diagram of an interaction-event routing system 130 according to one example of the present disclosure. The components shown in FIG. 2, such as a processor 202, a memory 204, a bus 206, and the like, may be integrated into a single structure such as within the single housing of the interaction-event routing system 130. Alternatively, the components shown in FIG. 2 can be distributed from one another and in electrical communication with each other.

As shown, the interaction-event routing system 130 includes the processor 202 communicatively coupled to the memory 204 by the bus 206. The processor 202 can include one processor or multiple processors. Non-limiting examples of the processor 202 include a Field-Programmable Gate Array (FPGA), an application specific integrated circuit (ASIC), a microprocessor, or any combination of these. The processor 202 can execute instructions 210 stored in the memory 204 to perform operations. In some examples, the instructions 210 can include processor-specific instructions generated by a compiler or an interpreter from code written in any suitable computer-programming language, such as C, C++, C#, Python, or Java.

The memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. At least some of the memory 204 can include a non-transitory computer-readable medium from which the processor 202 can read instructions 210. The non-transitory computer-readable medium can include electronic, optical, magnetic, or other storage devices capable of providing the processor 202 with the instructions 210 or other program code. Non-limiting examples of the non-transitory computer-readable medium include magnetic disk(s), memory chip(s), RAM, an ASIC, or any other medium from which a computer processor can read instructions 210.

The memory 204 can further include a request 212 to process an interaction-event, a rail-specific request 214, an instructions store 138, an optimal rail-integration handler 218, and an optimal interaction-event rail 216. The interaction-event routing system 130 can receive the request 212 to process the interaction-event from an API of a plurality of APIs 102. The request 212 can include parameters. The interaction-event routing system 130 can automatically select, based on the parameters, the optimal interaction-event rail 216 from among a plurality of interaction-event rails 104 to process the interaction-event. The interaction-event routing system 130 can forward the request to the optimal rail-integration handler 218 from among a plurality of rail-integration handlers 106. The optimal rail-integration handler 218 can correspond or relate to the optimal interaction-event rail 216.

The optimal rail-integration handler 218 can transform the request 212 into a rail-specific request 214 suitable for the optimal interaction-event rail 216. The optimal rail-integration handler 218 can submit the rail-specific request 214 to the optimal interaction-event rail 216. The optimal interaction-event rail 216 can digitally transfer value between accounts using protocols that are specific to the optimal interaction-event rail 216.

Figure 3:
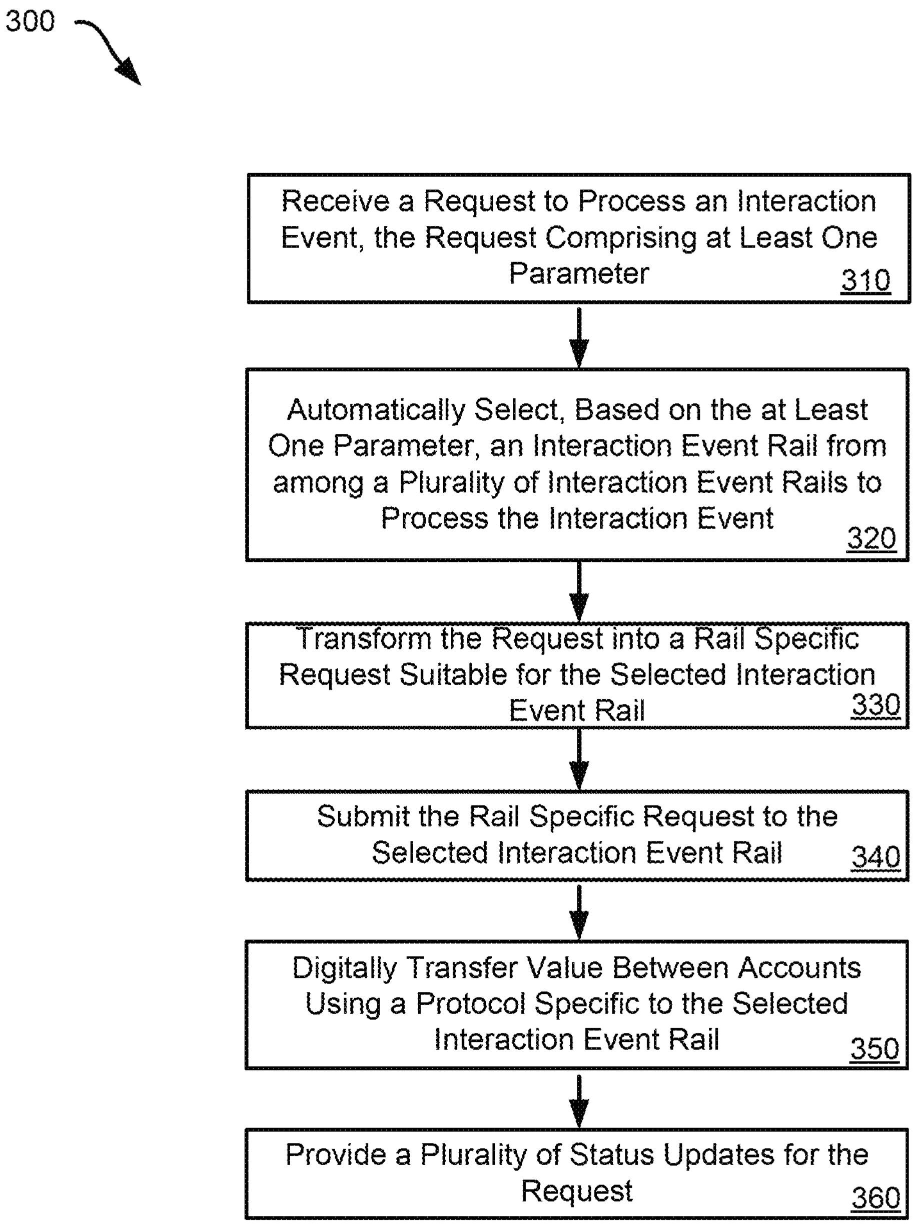
FIG. 3 is a flow chart of an example of a computer-implemented process for routing interaction-events according to some aspects of the present disclosure.

In some examples, the interaction-event routing system 130 can implement a computer-implemented process 300 shown in FIG. 3 for effectuating some aspects of the present disclosure. Other examples can involve more operations, fewer operations, different operations, or a different order of the operations shown in FIG. 3.

FIG. 3 is a flow chart of a computer-implemented process 300 for routing interaction-events according to one example of the present disclosure. Operations of computer-implemented processes may be performed by software, firmware, hardware, or a combination thereof. The operations of the computer-implemented process 300 start at block 310.

At block 310, the computer-implemented process 300 involves receiving a request 212 to process an interaction-event, the request 212 comprising at least one parameter. The request 212 can be received by a router processor 132 of an interaction-event routing system 130. The at least one parameter can be included in header information of the request 212 or elsewhere in the request 212.

One example of the parameter may include a unique identifier of an optimal interaction-event rail 216 to process the request 212. Other examples of parameters can include a category of the API that transmitted the request 212, a category for the interaction-event, a time limit to complete processing for the interaction-event, information regarding accounts related to the interaction-event, etc. Further examples of parameters can include details associated with the request 212, such as a source or recipient associated with the request 212. Some of the parameters may be explicitly provided by a client associated with the request 212, while others can be inferred based on characteristics of the request 212.

At block 320, the computer-implemented process 300 involves automatically selecting, based on the at least one parameter, the optimal IER 216 from a plurality of IERs to process the interaction-event. The router processor 132 can use a configuration handler module 136, a rules engine 134, and/or an instructions store 138 to automatically select, based on the parameters, the optimal interaction-event rail 216. For example, if the at least one parameter is included in the header information, the router processor 132 can use a handler configuration module 136 to identify a candidate rail integration handler with capabilities that can satisfy parameters specified in the header information. Once a single candidate rail integration handler is identified, an interaction event rail associated with the single candidate rail integration handler can be selected as the optimal interaction-event rail. Once the request 212 is processed, processing details associated with the request 212 can be saved in the instructions store 138. Processing details can specify an amount of time elapsed during processing, the interaction-event rail selected to process the request 212, an amount of value transferred in processing the request 212, a quantity that was minimized or maximized during interaction-event processing, details for at least one account, etc. The processing details stored in the instructions store 138 can be useful for selecting optimal interaction-event rails. As an example, when a request is identified as one request in a series of recurring interaction-event request, the one request can be compared to processing details from previous requests in the series. If the parameters in the one request match parameters from the processing details, the interaction-event rail selected previously can be automatically selected for the latest request in the series of recurring interaction-event requests.

If a single candidate rail integration handler cannot be determined from the header information, the router processor 132 can use the rules engine 134 to automatically select the optimal IER 216. The rules engine 134 can include logic for identifying optimal interaction-event rails based on request parameters. For example, if the request parameters include a time limit to complete processing for the interaction-event, the rules engine 134 can be used to eliminate a plurality of candidates for the optimal IER 216 based an average minimum time for completion of interactive events associated with each candidate of the plurality of candidates. The rules engine 134 can automatically recognize that the average minimum time is greater than the time limit.

In some examples, automatically selecting the optimal IER 216 can include creating a ranked list of candidates for the optimal IER 216. The ranked list can only include candidates that can process the interaction-event according to the request parameters. The ranked list can include the optimal IER 216, a first back-up IER, a second back-up IER, a third back-up IER, etc.

In some examples, the router processor 132 can recognize that the optimal interaction event rail 216 is found in a different interaction-event routing system. For example, an administrator may initiate a process for updating the interaction-event routing system from a previous interaction-event routing system to an updated interaction-event routing system. During the update process, both the previous—and the updated—routing systems may be deployed concurrently. The previous—and updated—routing systems may not necessarily use all of the same interaction-event rails. In some such examples, the router processor 132 of the updated interaction-event routing system can select an interaction-event rail from the previous interaction-event routing system as the optimal interaction-event rail, for example, based on the type of request received. The interaction-event routing system 130 can then send the request to the previous interaction-event routing system for handling. The previous interaction-event routing system can relay the request 212 to the optimal interaction-event rail.

At block 330, the computer-implemented process 300 involves transforming the request 212 into a rail-specific request 214 suitable for the selected IER 216. Prior to transforming the request 212, the request 212 can be forwarded from the router processor 132 to an optimal RIH 218. The optimal RIH 218 can correspond or be related to the selected IER 216. Transforming the request 212 can be performed by the corresponding RIH 218. Transforming the request 212 into the rail-specific request 214 can include reformatting the request or adding client information to the request 212. Transforming the request can involve converting the parameters of the request into rail-specific parameters, which can include additional details or reformatted details compared to the original parameters of the request. In some examples, information provided with the request 212 can be independently verified by the optimal RIH 218.

At block 340, the computer-implemented process 300 involves submitting the rail-specific request 214 to the selected interaction-event rail 216. The selected interaction-event rail 216 can process the interaction event according to the rail-specific instruction details included in the rail-specific request 214. In some examples, the rail-specific request 214 can be sent as part of a batch of rail specific requests. Batches of rail specific requests can be submitted periodically.

In some examples, a problem can occur when trying to submit the rail-specific request 214 to the selected interaction-event rail 216. For example, the interaction-event routing system 130 can detect that the selected interaction-event rail 216 is down (e.g., unreachable). Different issues may have different levels of complexity and therefore take different amounts of time to resolve. More complex issues may take longer to resolve, while less complex issues may take less time to resolve. Depending on the type of issue, the expected downtime may be known, such as when the selected interaction-event rail 216 is down for a scheduled routine maintenance. The expected downtime can also be unknown. In those situations, the interaction-event routing system can estimate the expected downtime based on historical data associated with previous similar issues detected for the selected interaction-event rail 216.

Once the issue with the selected interaction-event rail 216 is detected, the interaction-event routing system 130 can notify the API that sent the request 212 of the issue. The router processor 132 can flag the interaction-event rail with the issue as an inoperative interaction-event rail. The interaction-event routing system 130 may remove the inoperative interaction-event rail as a possible candidate for selection as an optimal interaction-event rail for a time period. The time period can be based on the complexity of the issue. If the issue has been detected previously, the interaction-event routing system can predict the time period based on an average time to resolve the issue in the past. If the issue is more complex than previous similar issues, the interaction-event routing system 130 can remove the inoperative interaction-event rail as a possible candidate for a longer period of time than the average time to resolve previous similar issues. Conversely, if the issue is less complex than previous similar issues, the interaction-event routing system 130 can remove the inoperative interaction-event rail as a possible candidate for a shorter period of time than the average time to resolve previous similar issues.

In some examples, after the issue is detected, the request can be forwarded to a first back-up rail integration handler. The first back-up rail integration handler may be the next interaction-event rail in a ranked list of interaction-event rails determined based on the parameters associated with the request, as described above. The first back-up rail integration handler can transform the request 212 into a first back-up specific request suitable for the first back-up interaction-event rail. The first back-up specific request can be submitted to the first back-up interaction-event rail and the first back-up interaction-event rail can process the interaction-event.

At block 350, the computer-implemented process 300 involves digitally transferring value between accounts using a protocol specific to the selected interaction-event rail 216. The accounts can originate in different countries and the interaction event can be an international interaction-event. Transferring value can also include converting units of the value in one account to different units in the transferred account.

At block 360, the computer-implemented process 300 involves providing a plurality of status updates for the request 212. The plurality of updates regarding the interaction-event can be sent from the selected interaction-event rail 216 to the API that submitted the request 212 via the interaction-event routing system 130. In some examples, the optimal rail-integration handler 218 can provide updated information associated with the rail-specific request 214 to the instructions store 138. The updated information can be used to streamline future requests for interaction-event processing, such as for associated recurring interaction-events.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. An interaction-event routing system comprising:

one or more processors;

one or more memories that include instructions executable by the one or more processors to perform operations comprising:

receiving a request to process an interaction-event from an application programming interface (API), wherein the request includes instructions to transfer a value associated with the interaction-event from a first account to a second account;

determining that an interaction-event rail capable of processing the interaction-event does not exist in a first interaction-event routing system, wherein the determination that the interaction-event rail capable of processing the interaction-event does not exist in the first interaction-event routing system occurs during a selection process in which the one or more processors selects between the first interaction-event routing system and a second interaction-event routing system;

determining that the interaction-event rail capable of processing the interaction-event is located in the second interaction-event routing system;

determining one or more required fields for the interaction-event rail in the second interaction-event routing system;

transforming the request to include the one or more required fields, wherein transforming the request comprises:

determining a real-time payment rail integration handler that corresponds to the interaction-event rail, wherein the real-time payment rail integration handler is configured to transform the request into a rail-specific request by mapping parameters within the request to the one or more required fields; and submitting, based on instructions from the real-time payment rail integration handler, the rail-specific request to the second interaction-event routing system for processing by the interaction-event rail; and digitally transferring, using the interaction-event rail and based on the rail-specific request, the value between the first account and the second account using a protocol specific to the interaction-event rail.

2. The interaction-event routing system of claim 1, wherein, during the selection process, the first interaction-event routing system and the second interaction-event routing system are deployed concurrently.

3. The interaction-event routing system of claim 1, wherein the first interaction-event routing system and the second interaction-event routing system include at least one shared interaction-event rail.

4. The interaction-event routing system of claim 1, wherein the operations further comprise:

determining content of the request;

determining a category of the content; and selecting the interaction-event rail, from among a plurality of interaction-event rails, based on the category of the content.

5. The interaction-event routing system of claim 1, wherein the operations further comprise:

determining a processing time from receiving the request to submitting the rail-specific request; and updating one or more parameters associated with: i) the first interaction-event routing system, ii) the second interaction-event routing system, or iii) both, based at least in part on the processing time.

6. The interaction-event routing system of claim 5, wherein the operations further comprise:

determining that the one or more parameters of the request match at least one parameter of a second request; and based on determining that the one or more parameters of the request match the at least one parameter of the second request, selecting the interaction-event rail in the second interaction-event routing system for processing the second request.

7. The interaction-event routing system of claim 1, further comprising:

a router processor configured to, based on instructions from the one or more processing devices, receive the request from the API and automatically select the interaction-event rail to process the interaction-event based on the parameters in the request that include at least one of: a category of the API that transmitted the request, a category for the interaction-event, a time limit to complete processing of the interaction-event, and information regarding the first account and the second account, the router processor being further configured to forward the request to the second interaction-event routing system.

8. A computer implemented method comprising:

receiving a request to process an interaction-event from an application programming interface (API), wherein the request includes instructions to transfer a value associated with the interaction-event from a first account to a second account;

determining that an interaction-event rail capable of processing the interaction-event does not exist in a first interaction-event routing system, wherein the determination that the interaction-event rail capable of processing the interaction-event does not exist in the first interaction-event routing system occurs during a selection process in which the one or more processors selects between the first interaction-event routing system and a second interaction-event routing system;

determining that the interaction-event rail capable of processing the interaction-event is located in the second interaction-event routing system;

determining one or more required fields for the interaction-event rail in the second interaction-event routing system;

transforming the request to include the one or more required fields, wherein transforming the request comprises:

determining a real-time payment rail integration handler that corresponds to the interaction-event rail, wherein the real-time payment rail integration handler is configured to transform the request into a rail-specific request by mapping parameters within the request to the one or more required fields; and submitting, based on instructions from the real-time payment rail integration handler, the rail-specific request to the second interaction-event routing system for processing by the interaction-event rail; and digitally transferring, using the interaction-event rail and based on the rail-specific request, the value between the first account and the second account using a protocol specific to the interaction-event rail.

9. The computer implemented method of claim 8, wherein during the selection process the first interaction-event routing system and the second interaction-event routing system are deployed concurrently.

10. The computer implemented method of claim 8, wherein the first interaction-event routing system and the second interaction-event routing system include at least one shared interaction-event rail.

11. The computer implemented method of claim 8, further comprising:

determining content of the request;

determining a category of the content; and selecting the interaction-event rail, from among a plurality of interaction-event rails, based on the category of the content.

12. The computer implemented method of claim 8, further comprising:

determining a processing time from receiving the request to submitting the rail-specific request; and updating one or more parameters associated with: i) the first interaction-event routing system, ii) the second interaction-event routing system, or iii) both, based at least in part on the processing time.

13. The computer implemented method of claim 12, further comprising:

determining that the one or more parameters of the request match at least one parameter of a second request; and based on determining that the one or more parameters of the request match the at least one parameter of the second request, selecting the interaction-event rail in the second interaction-event routing system for processing the second request.

14. The computer implemented method of claim 8, further comprising:

receiving, at a router processor, the request from the API;

automatically select, using the router processor, the interaction-event rail to process the interaction-event based on the parameters in the request that include at least one of: a category of the API that transmitted the request, a category for the interaction-event, a time limit to complete processing of the interaction-event, and information regarding the first account and the second account; and forwarding, using the router processor, the request to the second interaction-event routing system.

15. A non-transitory computer-readable medium comprising instructions that are executable by one or more processing devices for causing the one or more processing devices to perform operations comprising:

receiving a request to process an interaction-event from an application programming interface (API), wherein the request includes instructions to transfer a value associated with the interaction-event from a first account to a second account;

determining that an interaction-event rail capable of processing the interaction-event does not exist in a first interaction-event routing system, wherein the determination that the interaction-event rail capable of processing the interaction-event does not exist in the first interaction-event routing system occurs during a selection process in which the one or more processors selects between the first interaction-event routing system and a second interaction-event routing system;

determining that the interaction-event rail capable of processing the interaction-event is located in the second interaction-event routing system;

determining one or more required fields for the interaction-event rail in the second interaction-event routing system;

transforming the request to include the one or more required fields, wherein transforming the request comprises:

determining a real-time payment rail integration handler that corresponds to the interaction-event rail, wherein the real-time payment rail integration handler is configured to transform the request into a rail-specific request by mapping parameters within the request to the one or more required fields; and submitting, based on instructions from the real-time payment rail integration handler, the rail-specific request to the second interaction-event routing system for processing by the interaction-event rail; and digitally transferring, using the interaction-event rail and based on the rail-specific request, the value between the first account and the second account using a protocol specific to the interaction-event rail.

16. The non-transitory computer-readable medium of claim 15, wherein during the selection process the first interaction-event routing system and the second interaction-event routing system are deployed concurrently.

17. The non-transitory computer-readable medium of claim 15, wherein the first interaction-event routing system and the second interaction-event routing system include at least one shared interaction-event rail.

18. The non-transitory computer-readable medium of claim 15, wherein the operations further comprise:

determining content of the request;

determining a category of the content; and selecting the interaction-event rail, from among a plurality of interaction-event rails, based on the category of the content.

19. The non-transitory computer-readable medium of claim 15, wherein the operations further comprise:

determining a processing time from receiving the request to submitting the rail-specific request; and updating one or more parameters associated with: i) the first interaction-event routing system, ii) the second interaction-event routing system, or iii) both, based at least in part on the processing time.

20. The non-transitory computer-readable medium of claim 15, wherein the rail-specific request is a first rail-specific request, and wherein the operations further comprise:

determining that the interaction-event rail in the second interaction-event routing system is experiencing downtime;

estimating the downtime of the interaction-event rail based on historical data;

in response to determining that the interaction-event rail is experiencing downtime, transmitting an alert to an interface, wherein the alert includes information related to the interaction-event rail;

in response to the downtime exceeding an average time threshold provided by the historical data, flagging the interaction-event rail as an inoperative interaction-event rail;

selecting a back-up interaction-event rail in the second interaction-event routing system as a result of flagging the interaction-event rail as the inoperative interaction-event rail;

transforming the first rail-specific request into a second rail-specific request suitable for the back-up interaction-event rail, wherein transforming the request into the rail specific request involves reformatting the first rail-specific request or adding client information to the first rail-specific request; and submitting the second rail-specific request to the back-up interaction-event rail.

* * * * *